United States Patent [19]

Mann et al.

[11] 4,171,073

[45] Oct. 16, 1979

[54] REPEATABLE FLUID DISPENSER

[75] Inventors: Herman C. Mann, San Francisco; Robert N. Mann, San Bruno, both of Calif.

[73] Assignee: 4M Biological Products and Services, San Francisco, Calif.

[21] Appl. No.: 822,883

[22] Filed: Aug. 8, 1977

[51] Int. Cl.[2] .......................... B01L 3/02; G01F 11/06

[52] U.S. Cl. .................................... 222/309; 73/425.6

[58] Field of Search ......................... 73/425.4 P, 425.6; 222/383, 385, 309

[56] References Cited

U.S. PATENT DOCUMENTS

| | | | |
|---|---|---|---|
| 1,757,733 | 5/1930 | Pritchard | 222/383 |
| 3,191,807 | 6/1965 | Rodrigues | 222/309 |
| 3,478,934 | 11/1969 | Lindquist | 222/309 |
| 3,722,758 | 3/1973 | Warren et al. | 222/385 |

*Primary Examiner*—S. Clement Swisher

[57] ABSTRACT

Currently available repeatable fluid dispensers require two valves. This invention eliminates one valve thus making possible a dispenser of more compact design and which possesses greater accuracy, greater precision and improved capability to dispense micro-quantities of fluid.

1 Claim, 1 Drawing Figure

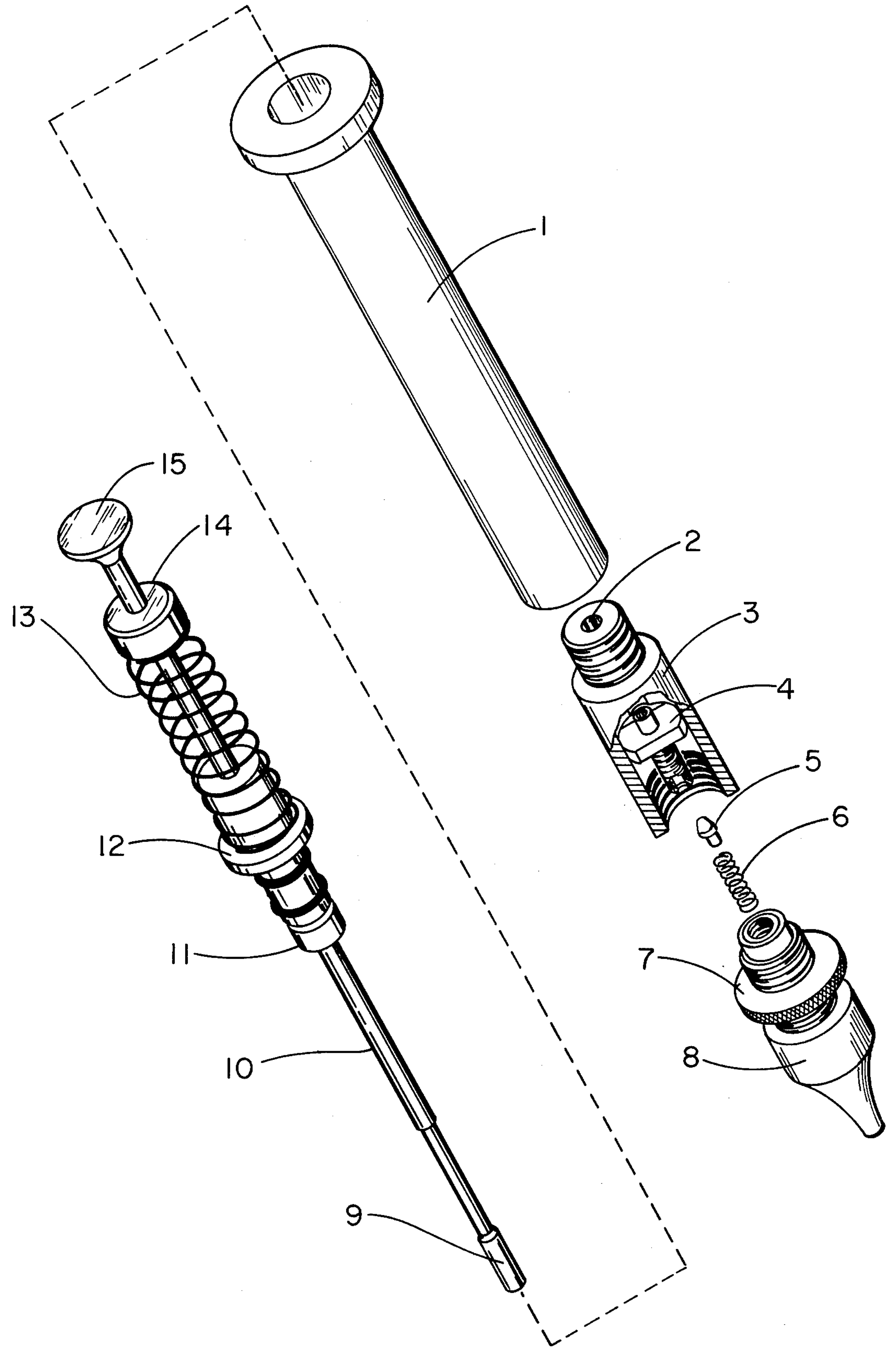
1
2
3
4
5
6
7
8
9
10
11
12
13
14
15

REPEATABLE FLUID DISPENSER

BACKGROUND

Medical laboratories, particularly clinical chemistry laboratories, are in need of a compact repeatable dispenser capable of dispensing volumes in the microliter range. The dispenser should be highly accurate, highly precise and essentially maintenance free. The forces which are stimulating this need are both economic and technical: Economic in terms of both the amount of biological sample needed and in terms of the amount of reagents consumed. Technical in terms of the newer procedures such as radio-immune assays which measure concentrations in the nanogram per deciliter range. No dispenser currently available satisfies completely the above requirements. It is the object of the present invention to do so.

SUMMARY OF THE INVENTION

The above objects of this invention will be accomplished and the advantages obtained by utilizing the principle of negative pressure, i.e. a vacuum. Specifically, the device requires only two moving parts, a piston operating reciprocally within a cylinder and a single valve. The simplest design employs an internal fluid reservoir above the cylinder. The cylinder is calibrated for a given volume, adjustments to which can be made by means of an adjustable piston stop.

BRIEF DESCRIPTION OF THE DRAWING

An understanding of the invention will be facilitated by referring to the attached drawing which is a disassembled view of the device. The lower portion is exploded to show the valve arrangement and the adjustable piston stop.

DESCRIPTION OF THE EMBODIMENTS

The essential elements of the device are shown in the drawing. Reference will be made to the numbered parts in the following description: The dispensing fluid is held in the fluid reservoir 1. The piston 9 is made in a manner such that an airtight seal is formed between the piston and the cylinder walls of the calibrated cylinder 2. One end of the adjustable stop 4 is made to fit frictionally inside the cylinder, the other end is threadably attached to the dispenser tip 8 allowing for adjustment of the stop. A lock-nut 7 is provided to secure the assembly once calibration is complete. The inside of stop 4 is fitted with a valve seat to accomodate valve 5 and spring 6.

The device is made to operate in the following manner, beginning with the calibrated cylinder filled only with air and with fluid in the fluid reservoir:

A. Piston 9 is forced toward valve 5 by applying manual pressure to button 15.

B. The air in cylinder 2 is forced past valve 5 which closes when the piston contacts the adjustable stop 4.

C. The piston is retracted by spring 13 until the stop 11 on the piston rod 10 contacts the fluid reservoir cap 12. Stop 11 is adjustable and positioned so that the piston clears the calibrated cylinder. Retraction of the piston creates a negative pressure in the cylinder, thus, when the piston clears the cylinder, fluid is forced into the cylinder by atmospheric pressure.

D. Forcing the piston again toward valve 5 displaces the fluid in the cylinder past the valve. This process can be repeated until the fluid in the reservoir is exhausted.

We claim:

1. A repeatable dispenser comprising an elongated reservoir, a member having a calibrated cylindrical bore extending therethrough closing one end of the reservoir, a plunger extending longitudinally through said reservoir having a piston mounted at the end for reciprocating movement within said calibrated cylindrical bore, a dispenser tip carried by said member having a second bore alligned with said calibrated cylindrical bore, a stop adjustably mounted within said second bore and extending into said calibrated cylindrical bore to limit the downard motion of said piston, a check valve permitting flow of fluid through the bore toward the tip and preventing flow in the opposite direction, and a spring acting to move the plunger and piston in the calibrated cylindrical bore to overcome atmospheric pressure acting upon the piston.

* * * * *